United States Patent [19] [11] 3,731,070
Urban [45] May 1, 1973

[54] GAS TURBINE ENGINE ANALYZER
[75] Inventor: Louis A. Urban, Granby, Conn.
[73] Assignee: United Aircraft Corporation, East Hartford, Conn.
[22] Filed: Apr. 27, 1971
[21] Appl. No.: 137,924

[52] U.S. Cl. .................. 235/151.3, 73/116, 444/1
[51] Int. Cl. ......................... G06f 15/20, G06f 15/32
[58] Field of Search .................. 235/151.3; 73/116; 444/1

[56] References Cited

UNITED STATES PATENTS 3,310,666  3/1967  Millar et al. ............... 235/151.3 X
3,584,507  6/1971  Hohenberg .................. 73/116

Primary Examiner—Eugene G. Botz
Assistant Examiner—R. Stephen Dildine, Jr.
Attorney—Norman Friedland

[57] ABSTRACT

The relative health of a gas turbine engine is analyzed and the particular faults are automatically determined by sensing monitored parameters of the gas path of gas turbine engine and electronically computing them into thermodynamically independent variables and comparing the rate of change of this value with a base line value used as a reference datum. A special purpose computer is programmed to include a general influence coefficient matrix containing the independent variables selected to determine the specific fault and serves to thermodynamically simulate the engine's operations.

11 Claims, 3 Drawing Figures

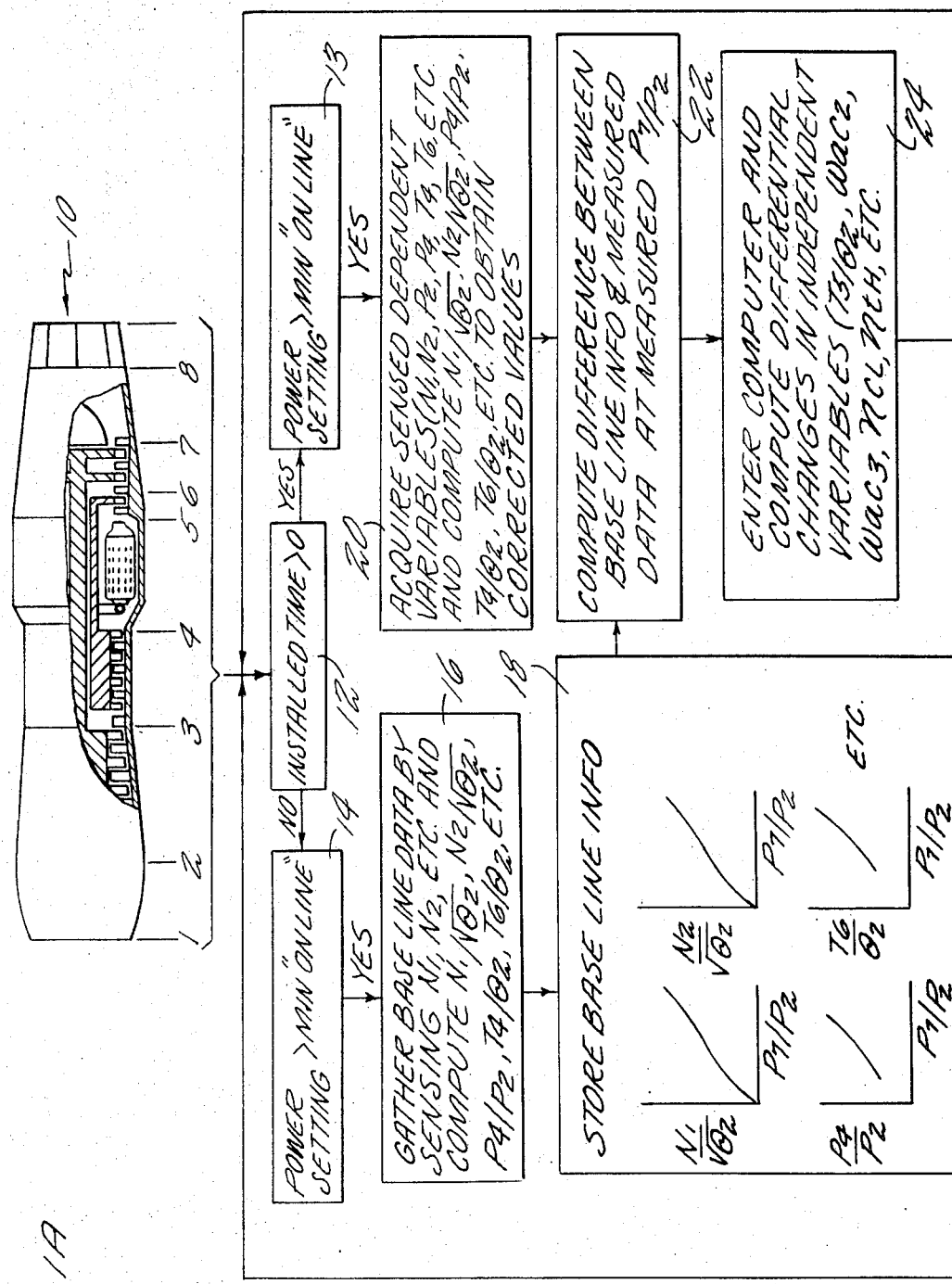

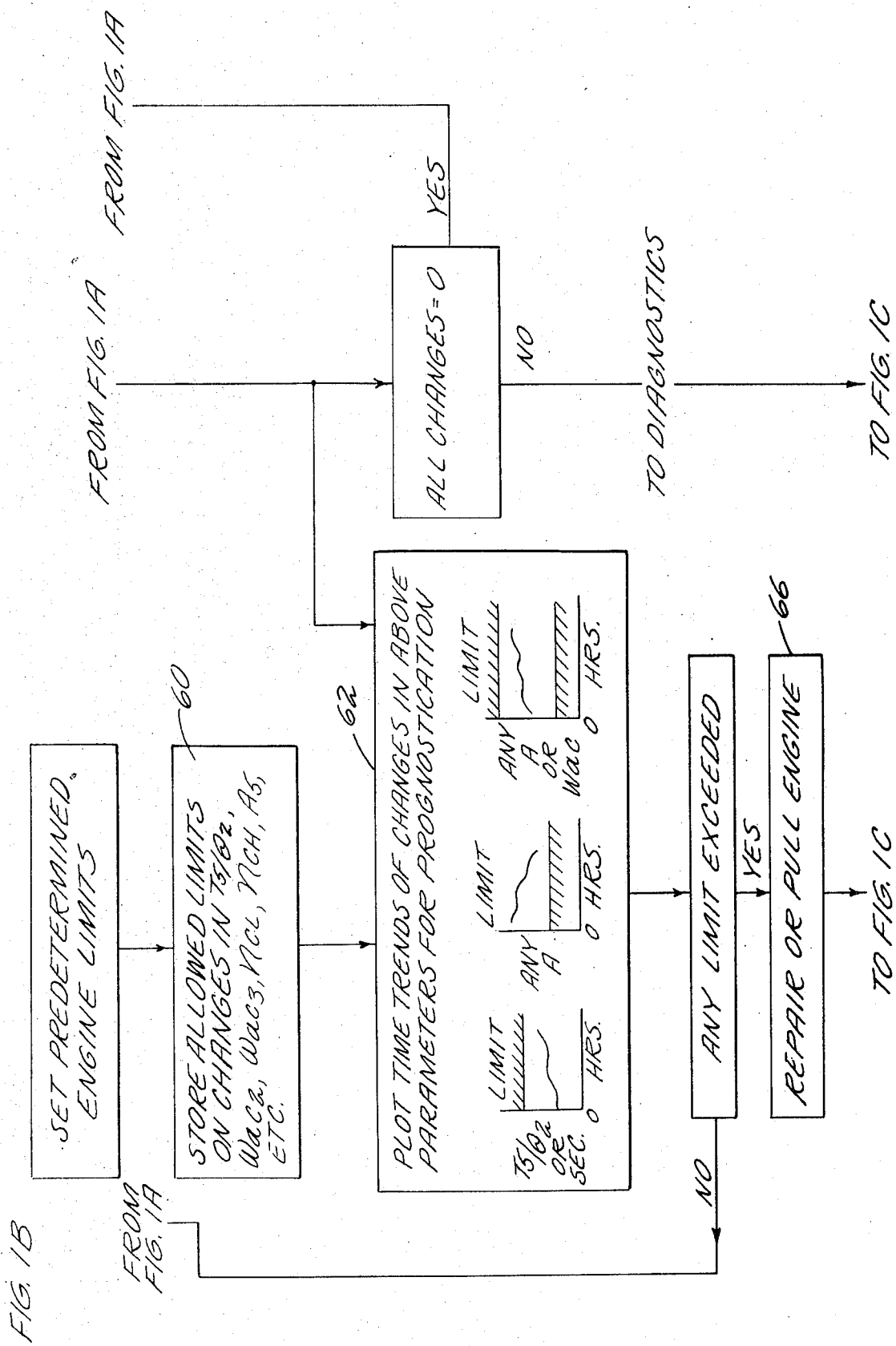

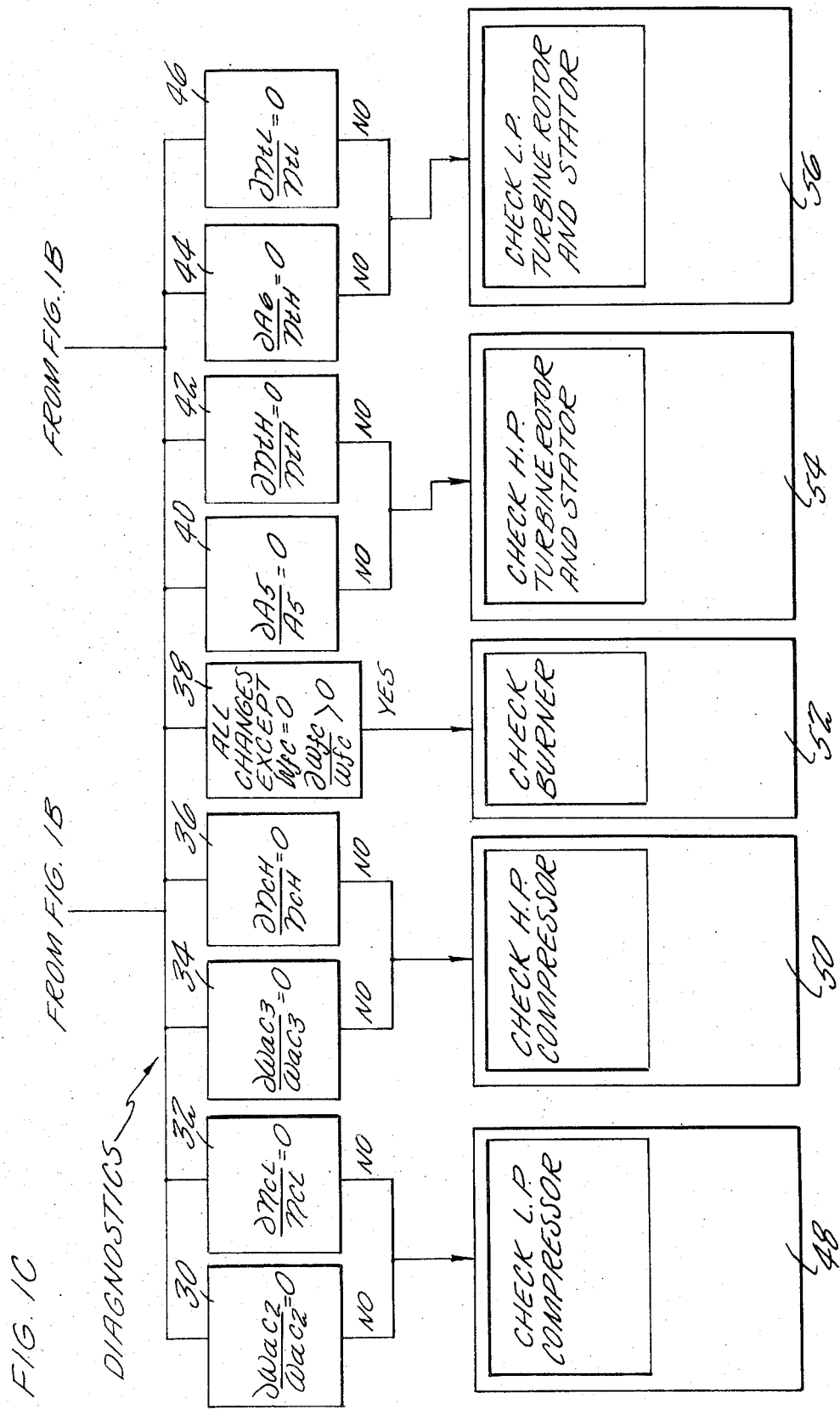

GAS TURBINE ENGINE ANALYZER

BACKGROUND OF THE INVENTION

This invention relates to gas turbine engine analyzers and particularly to an analyzer that relates the faults diagnosed to independent thermodynamic variables obtained by analyzing the gas flow path through the gas turbine engine.

Economics, the advent of high speed electronic computers, inadequacies obtained by overhauling engines at empirically obtained time intervals and an immediate need to know engine faults have led to the development of devices designed to determine the relative health of the engine and other aircraft components. This invention is particularly concerned with analyzing the health of a gas turbine engine as contrasted to devices that are intended to monitor dependent variables of the engines as part of an entire aircraft system.

The latter type of heretofore known systems more or less monitor, gather and store a plurality of sensed variables which are in turn investigated by an operator who statistically arrives at a diagnosed fault. Thus, an operator would review the obtained monitored dependent variables and from a historically precedented trial and error basis would attempt to diagnose and prognosticate the engine's malfunction. Obviously, the success of such techniques depends generally on whether the failure pattern has occurred before, whether the operator has recognized such a failure by the limited number of parameters monitored, and whether the data analyzed was accurate and timely. In any event human judgment is an important factor in diagnosing and prognosticating engine faults. A good understanding of the prior art devices may be had by referring to the AIAA Paper No. 70-935 entitled "Computerized Airborne Integrated Data Systems" by Howard J. Moses given at the July 20-22, 1970 meeting at Los Angeles, California.

I have found that I can minimize or eliminate the human judgment aspect by electronically simulating the operation of the engine by utilizing a special purpose computer programmed to contain a matrix containing the general influence coefficient of the gas path of the gas turbine engine. The matrix is stored thermodynamic differential equations indicative of the true prime independent variables selected to "pinpoint" actual mechanical faults upon the occurrence of changes in these variables. The mechanical problems isolated by analyzing the gas path are the types that are incidental to those occurring when the independent variables (efficiencies, changes in pumping capacity, and the like) vary. Such a system is not to be confused with the types of analyzers that measure mechanical parameters which indicate failures in bearings, structural fatigue, and the like and the faults which relate to the accessories driven by the engine, and not the engine itself.

By the use of this invention it is therefore possible to simultaneously evaluate all possible primary faults within the gas path, instantaneously.

One of the shortcomings associated with the heretofore known types of mechanical fault detection systems is that it is statistically possible to have multiple faults occurring wherein the effects of one fault will mask or cancel out the effect of the of the other fault on the chosen parameters and that it is mathematically and thermodynamically possible for a set of multiple faults to have an undistinguishably similar effect on the chosen parameter as a totally unrelated single fault. In accordance with this invention by selecting the proper independent variables computed by sensing known and available parameters, multiple faults can simultaneously and accurately be analyzed affording a higher degree of ability to "pinpoint" the actual fault. Again, this assures a more reliable and accurate method of obtaining fault as opposed to relying on the personal judgment of individuals who are adept in analyzing the monitored parameters and unable to discern a single fault when two or more faults tend to cancel out the effect of these faults.

SUMMARY OF INVENTION

The primary object of this invention is to provide an improved analyzer for a gas turbine engine to determine the relative health thereof.

A still further object of this invention is to provide an improved gas turbine engine analyzer that performs an analysis of the gas path thereof.

A still further object of this invention is to provide a gas turbine engine analyzer that monitors predetermined dependent engine operating variables and computes them into independent variables and measures changes therein to determine engine faults.

A still further object of this invention is to provide a gas turbine engine analyzer as described wherein faults are directly related to deviations in primary independent variables which are electronically computed through a general influence coefficient matrix from their effects on measurable dependent variables.

A still further object of this invention is to provide a gas path analyzer for a gas turbine engine that utilizes a special purpose computer having stored therein a base line (datum) of corrected dependent parameters obtained by monitoring engine operation and obtaining changes in independent variables computed from a general coefficient matrix and the changes in said dependent variables for singling out the faults of the engine.

A still further object of this invention is to provide means for prognosticating the future health of a gas turbine engine by utilizing a special purpose computer having stored therein preascertained limits of the preselected independent variables and computing and plotting at predetermined time intervals deviations in primary independent variables obtained by the general influence coefficient matrix and the computed changes in corrected dependent variables, referenced to the base line of corrected dependent variables.

Other features and advantages will be apparent from the specification and claims and from the accompanying drawings which illustrate an embodiment of the invention.

BRIEF DESCRIPTION OF THE DRAWINGS

FIGS. 1A, 1B, and 1C are schematic block diagrams illustrating the preferred embodiment of this invention.

DESCRIPTION OF THE PREFERRED EMBODIMENT

The following definitions are intended to lend clarity to an understanding of the invention but it is to be understood that they in no way are intended to limit the scope thereof.

Dependent Variable — Measurable physical parameters such as output power, temperatures, pressures, fuel flow rate, rotor speeds and combination thereof, whose absolute values or changes are established by the absolute values or changes of independent variables.

Independent Variable — Thermodynamic paramters such as air flow rates, component efficiencies, effective turbine nozzle areas and engine exhaust areas, whose absolute values or changes are established by the mechanical design and construction of the engine, or alterations thereto.

Faults — A mechanical malfunction or alteration in the gas path which affects performance of the gas turbine engine.

General influence coefficient matrix — The matrix consists of the coefficients of the set of differential equations defining the interrelationships among the various engine independent and dependent variables. The coefficient matrix is based on the gas turbine engine parameter interrelationships contained in a book entitled "Gas Turbine Engine Parameter Interrelationships" by Louis A. Urban, 1st and 2nd editions published by United Aircraft Corporation, 1967 and 1969, and those relationships are incorporated herein by reference.

Gas turbine engine — Refers to any type of gas turbine engine whether it be for a turboprop, fan or straight jet and including aircraft as well as industrial power plant uses.

While certain parameters selected may be dependent, they may be treated as independent variables in those cases where it is difficult to measure and obtain the same such as turbine inlet temperature (T.I.T.).

LIST OF SYMBOLS 1 to 8 (incl) = all reference numeral subscripts refer to stations in the engine unless indicated otherwise.

$N_1$ = Low compressor rotational speed in R.P.M.
$N_2$ = High compressor rotational speed in R.P.M.
$P$ = Pressure in pounds per square inch
$T$ = Temperature
$\theta$ = Correction to standard NACA DAY
$\eta\,CL$ = Low compressor adiabatic efficiency
$\eta\,H$ = *High turbine adiabatic efficiency*
$WaCL$ = Corrected air flow rate of low compressor in # /sec (pounds per second)
$WaCH$ = Corrected air flow rate of high compressor in # /sec
$\delta$ = Differential in calculus
$>, <$ = Greater than and less than respectively
$A$ = Area For a simple single spool turbojet engine the following symbols apply:

$N/\sqrt{\theta_2}$ = Referred compressor rotational speed in R.P.M.
$T_3/\theta_2$ = Referred compressor discharge temperature in degrees Rankine
$P_3/P_2$ = Pressure rise across the compressor
$(W_f)/(\delta\,2\sqrt{\theta_2})$ = Referred fuel flows in pounds/hour where $\delta$ is $P_2/14.7$ pounds per square inch
$T_5/\theta_2$ = Referred turbine temperature in degrees Rankine
$P_5/P_2$ = Engine pressure ratio
$A_n$ = Exhaust nozzle effective area
$WaC_2$ = Referred compressor gas flow
$\eta c$ = Compressor adiabatic efficiency
$A_4$ = Turbine inlet nozzle effective area
$\eta t$ = Turbine adiabatic efficiency Reference is now made to FIGS. 1A, 1B and 1C schematically illustrating in block diagram fashion the means of diagnosing and prognosing the jet engine generally illustrated by numeral 10 to ascertain its relative and prognostic health. The computers, sensors and electrical circuitry is considered to be well known in the art and a detailed description thereof has been eliminated herefrom for the sake of clarity and simplicity. The preselected parameters to be measured are predicated on the type of engine which is being evaluated, the accessibility of parameters and the extent of faults intended to be obtained. When the engine is first installed whether it be for aircraft or industrial purposes the base line of the parameters sensed is established, then stored to be used as a referenced datum for comparison with actual measurements occurring subsequently in order to obtain deviations therefrom. While the corrected sensed dependent variables are shown to be measured at a particular pressure ratio across the engine, in this instance P7/P2, this particular parameter may be any engine parameter indicative of engine operation and will be selected on the basis of its availability. Thus this parameter could be any pressure, speed, temperatures and the like. As shown in FIGS. 1A the selected signals are passed through the gate identified by the block 12 and upon the initial installation of the engine (that is when installed time is zero) the signals will be passed to the left into the block 14. When the power setting is above some value greater than minimum, "on-line" position it will be transmitted into computer 16 where the sensed signals (dependent variables) such as speeds, pressures and temperatures are converted into corrected values, i.e. referred to a standard base and transmitted to the next station which set up the datum values. As mentioned above the corrected dependent variables will be measured against the arbitrarily selected P7/P2 parameter to set up and store the datum lines for each dependent variable measured. Thus, each corrected dependent variable will have a base line information established for the selected parameter formed as the abscissa in the graph shown in the block 18.

Once this data has been collected and stored the engine will be continuously or intermittantly monitored and analyzed in order to ascertain the relative health thereof. Hence the signals appearing in box 12 will then be transmitted to the right hand side and transmitted to box 13. When the power lever is set above the on-line value the proper signals will be transmitted to computer 20 which receives the dependent variables such as speed, pressures and temperatures so as to convert them into the corrected parameters similarly to what was done with the base line data. These signals are accepted by comparator 22 and any difference therein will be transmitted to the computer 24 which contains the general coefficient matrix for converting changes in dependent variables into differential changes in independent variables. The matrix which is preascertained and stored in the computer consists of the coefficients of the set of differential equations defining the interrelationships among the various engine independent and dependent variables as may be obtained in the book entitled "Gas Turbine Engine Parameter Interrelationships" supra.

It is apparent from the foregoing that the general coefficient converts the dependent variables into the independent variables. Since absolute values of dependent variables are determined by absolute values of independent variables, changes in the dependent variables will give changes in the independent variables. It therefore will be appreciated that since the computer computes the relative changes of the dependent variables and independent variables the true actual values of the dependent and independent variables are inconsequential. The output of computer 24 will be signals indicative of the differential changes in the independent variables. This affords the advantage of not having to rely on true values of the sensed and computed parameters since the computing is dealing only with relative changes of the dependent and independent variables.

The output signals of computer 24 pass onto the diagnostics when a relative change has been detected. The diagnostics is a series of precalculated OR gates 30, 32, 34, 36, 38, 40, 42, 44, 46 indicating the differential changes of the independent variables, and senses all the output signals and isolates the independent variable having shown a deviation from the base line information. This signal is allowed to pass to the proper fault indicator, i.e. fault indicator 48, 50, 52, 54, or 56 indicating to the operator what component should be inspected in the engine to locate the fault.

Thus, the fault indicators, which may be a hard copy paper printout or window that lights up when a fault is detected, will list the particular locations that are likely to be the cause of the fault.

For example, if pumping capacity or efficiency in boxes 30 and 32 are degraded the indicia on window 48 will light up indicating to the operator to check tip clearances, dirt buildup, erosion, damaged blades, missing blades, damaged seals, and the like in the low pressure compressor section.

Likewise, if the window 10 is actuated the indicia will advise the operator to check the high pressure compressor for similar defects.

In each instance the indicia on the windows of the check points will "pinpoint" the particular station in the engine to be checked and list the particular faults to look for as to cure the cause of the degradation.

For the prognostic portion of the analyzer, the limits in terms of changes of the independent variables of the engine will be stored in memory box 60 and transmitted to the trend indicator 62, which may be a permanent read out. Changes of independent variables from computer 24 are recorded at given time intervals so that the operator can continuously observe the trends in the degradations of the independent variables. When these limits are exceeded, a signal will actuate a visual indicator 66 to advise the operator to either repair or pull the engine, and transmitted to the diagnostic to "pinpoint" the particular fault or faults.

The following is an example showing how a typical general coefficient matrix can be calculated and programmed in the special purpose computer to obtain the differential changes in independent variables from changes in corrected dependent variables. Consider a simple single spool turbojet engine as illustrative. Assume the engine is designed to have a compressor pressure ratio and turbine inlet temperature of $P_3/P_2 = 10$ and $T_4/\theta_2 = 2160°R$ respectively. The general influence coefficient matrix for such an engine, as found on page 6 of "Gas Turbine Engine Parameter Interrelationships" supra, would be as follows:

| | $\dfrac{\partial T_4/\theta_2}{T_4/\theta_2}$ | $\dfrac{\partial N/\sqrt{\theta_2}}{N/\sqrt{\theta_2}}$ | $\dfrac{\partial Wac_2}{Wac_2}$ | $\dfrac{\partial \eta_c}{\eta_c}$ | $\dfrac{\partial A_4}{A_4}$ | $\dfrac{\partial \eta_t}{\eta_t}$ |
|---|---|---|---|---|---|---|
| $\dfrac{\partial T_3/\theta_2}{T_3/\theta_2}$ | 0.17 | 0.67 | 0.33 | $-0.55$ | $-0.33$ | 0 |
| $\dfrac{\partial P_3/P_2}{P_3/P_2}$ | 0.50 | 2.00 | 1.00 | 0 | $-1.00$ | 0 |
| $\dfrac{\partial W_f/\partial_2 \sqrt{\theta_2}}{W_f/\partial_2 \sqrt{\theta_2}}$ | 1.81 | 1.36 | 0.68 | 0.53 | 0.32 | 0 |
| $\dfrac{\partial T_5/\theta_2}{T_5/\theta_2}$ | 1.25 | $-0.43$ | $-0.21$ | 0.36 | 0.21 | 0 |
| $\dfrac{\partial P_5/P_2}{P_5/P_2}$ | 1.50 | 0.28 | 0.14 | 1.43 | $-0.14$ | 1.43 |
| $\dfrac{\partial A_n}{A_n}$ | $-0.86$ | 1.50 | 0.75 | $-1.25$ | 0.25 | $-1.43$ |

Assume that the measurable dependent variables corrected to standard day conditions have absolute values, when the engine is first installed and after it has run for 1,000 hours as follows:

| | Newly Installed | After 1000 hours |
|---|---|---|
| $N/\sqrt{\theta_2}$ | 100% | 100% |
| $T_3/\theta_2$ in°R | 1075 | 1086 |
| $P_3/P_2$ | 10.00 | 9.81 |
| $W_f/\delta\, 2\sqrt{\theta_2}$ | 100% | 105.3% |
| $T_5/\theta$ | 1680 | 1764 |
| $P_5/P_2$ | 3.10 | 3.06 | at the constant measured speed of $N/\sqrt{\theta_2} = 100$ percent, the measured changes in the dependent variables are computed to be $(\delta T_3/\theta_2)/(T_3/\theta_2) = (1086 - 1075)/(1075) = +0.010$
$(\delta P_3/P_2)/(P_3/P_2) = (9.81 - 10.00)/10.00 = -0.019$
$(\delta W_f/\delta 2\sqrt{\theta_2})/(W_f/\delta 2\sqrt{\theta_2}) = (105.3 - 100)/100 = +0.053$
$(\delta T_5/\theta_2/T_5/\theta_2) = (1764 - 1680)/1680 = +0.050$
$(\delta P_5/P_2)/(P_5/P_2) = (3.06 - 3.10)/3.10 = -0.013$
$(\delta N/\sqrt{\theta_2})/(N/\sqrt{\theta_2}) = (100-100)/100 = 0$ The computer inserts these values into the stored general influence coefficient matrix and makes a simultaneous solution of the following set of equations:

$$\frac{\partial T_3/\theta_2}{T_3/\theta_2} = 0.17 \frac{\partial T_4/\theta_2}{T_4/\theta_2} + 0.67(0) + 0.33 \frac{\partial Wac_2}{Wac_2} - 0.55 \frac{\partial \eta_c}{\eta_c} - 0.33$$

$$\frac{\partial A_4}{A_4} + 0\frac{\partial \eta_t}{\eta_t} = +.010$$

$$\frac{\partial P_3/P_2}{P_3/P_2} = 0.50\frac{\partial T_4/\theta_2}{T_4/\theta_2} + 2.00(0) + 1.00\frac{\partial W_{ac_2}}{W_{ac_2}}$$

$$+ 0\frac{\partial \eta_c}{\eta_c} - 1.00\frac{\partial A_4}{A_4} + 0\frac{\partial \eta_t}{\eta_t} = -.019$$

$$\frac{\partial W_f/\delta_2 \sqrt{\theta_2}}{W_f/\delta_2 \sqrt{\theta_2}} = 1.81\frac{\partial T_4/\theta_2}{T_4/\theta_2} + 1.36(0) + 0.68\frac{\partial W_{ac_2}}{W_{ac_2}}$$

$$+ 0.53\frac{\partial \eta_c}{\eta_c} + 0.32\frac{\partial A_4}{A_4} + 0\frac{\partial \eta_t}{\eta_t} = +.053$$

$$\frac{\partial T_5/\theta_2}{T_5/\theta_2} = 1.25\frac{\partial T_4/\theta_2}{T_4/\theta_2} - 0.43(0) - 0.21\frac{\partial W_{ac_2}}{W_{ac_2}}$$

$$+ 0.36\frac{\partial \eta_c}{\eta_c} + 0.21\frac{\partial A_4}{A_4} + 0\frac{\partial \eta_t}{\eta_t} = +.050$$

$$\frac{\partial P_5/P_2}{P_5/P_2} = 1.50\frac{\partial T_4/\theta_2}{T_4/\theta_2} + 0.28(0) + 0.14\frac{\partial W_{ac_2}}{W_{ac_2}}$$

$$+ 1.43\frac{\partial \eta_c}{\eta_c} - 0.14\frac{\partial A_4}{A_4} + 1.43\frac{\partial \eta_t}{\eta_t} = -.013$$

Note that in this case, the set represents five equations in terms of five unknowns. The computer is therefore programmed to solve them either by the principle of determinants or by matrix inversion, both of which are well known mathematical techniques, and in this case will yield the solution that $(\delta T_4/\theta_2)/(T_4/\theta_2) = +0.042$ The turbine inlet temperature has increased by 4.2 percent $$(\delta W_{ac_2})/(W_{ac_2}) = -0.02$$

The compressor air pumping capacity has decreased by 2 percent $$(\delta \eta_c/\eta_c) = -0.03$$

The compressor efficiency has decreased by 3 percent $$\delta A_4/A_4 = +0.02$$

The turbine inlet nozzle area has increased by 2 percent $$\delta \eta_t/\eta_t = -0.02$$

The turbine efficiency has decreased by 2 percent

Using the remaining equation of the general matrix the computer uses these values to solve for the change in $A_n$ as $(\delta A_n/A_n) = -0.86 (0.042) + 1.50 (0) + 0.75 (-0.02) -1.25 (-0.03) + 0.25 (0.02) -1.43 (-0.02) = +0.02$ The exhaust nozzle effective area has increased by 2 percent Diagnostic logic programmed and stored in the computer memory similar to the diagnostics shown in FIG. 1C would recognize the above computed deviations in the independent parameters as being indicative of a degraded compressor and turbine and a damaged exhaust nozzle, and the computer would print out the appropriate indicated messages for the information of the flight crew, maintenance crew, or other interested personnel.

The computed deviations, including the deviation in turbine inlet temperature, are plotted out as functions of time at period intervals similarly to the trend computer as shown in FIG. 1B to provide trends for prognostication purposes. The time rate of change of the various parameters thus can be used to indicate whether degradation is slow or rapid, and by extrapolation to determine useful life remaining of the various components and when the turbine inlet will approach dangerous over temperature.

While a specific example has been incorporated to show how to calculate the general coefficient matrix and the matrix was selected as shown in the book entitled "Gas Turbine Engine Parameter Interrelationships" supra, it is to be understood that the particular numerical values and the particular dependent and independent variables selected are for merely explanation purposes and as one skilled in the art will appreciate these values will be dependent on the engine and its end use as well as the particular faults intended to be analyzed.

What has been shown by this invention is apparatus and a system for analyzing the gas path of a gas turbine engine so as to diagnose and prognosticate the relative health of the engine. Such a system affords a readily available readout or indicator "pinpointing" the location and likely conditions that cause degradation of the engine. Additionally, such a system eliminates the necessity of sensing and measuring hard to or difficult to obtain parameters such as turbine inlet temperature, actual air flows and areas.

It should be understood that the invention is not limited to the particular embodiments shown and described herein, but that various changes and modifications may be made without departing from the spirit or scope of this novel concept as defined by the claims herein.

I claim:

1. The method of analyzing the gas path of a gas turbine engine for diagnosing the relative health thereof, comprising the steps of:
    measuring a plurality of engine dependent variables, establishing a datum of each of said dependent variables as a function of a predetermined engine dependent variable at a first instance of engine operation, monitoring said dependent variables after subsequent engine operation, computing the differences between said datum obtained in the step of establishing and the monitored engine dependent variables, computing the said differences into changes of independent variables, and collating the computed independent variable changes into particular engine faults.

2. The method of analyzing the gas path of a gas turbine engine as claimed in claim 1 including the additional step of computing said engine dependent variable into a value referenced to a predetermined standard base.

3. The method of analyzing the gas path of a gas turbine engine as claimed in claim 1 including the additional step of computing said engine dependent variable into a value referenced to a predetermined standard base to an N.A.C.A. standard day.

4. The method of analyzing the gas path of a gas turbine engine for diagnosing the relative health thereof, comprising the steps of
   establishing a datum for each of a plurality of engine dependent variables as a function of a predetermined engine dependent variable,
   sensing said engine dependent variables,
   generating an electronic signal indicative of the difference between said datum and said sensed engine dependent variables,
   computing said signal obtained in the step of generating an electronic signal for obtaining electronic output signals indicative of differential changes of engine independent variables, and relating said output signal into particular engine faults.

5. The method as claimed in claim 4 including the step of programming a matrix to contain coefficients of sets of differential equations defining the interrelationships amongst the selected engine dependent and independent variables and solving for the partial derivatives of the differential changes of the independent variables.

6. The method of claim 5 including the step of applying the output obtained in the step of solving to the input of a visual display adapted to receive only one of several outputs for relating the fault to said output.

7. The method of prognosticating the future health of a gas turbine engine comprising the steps of:
   registering a datum of each of a plurality of engine dependent variables as a function of a predetermined engine dependent variable,
   sensing said dependent engine variables,
   computing the difference between the datum and each of said monitored dependent variables for producing signals indicative of said differences,
   differentiating said signals into values indicative of differential changes of independent variables, establishing and plotting limits of said independent variables, and
   plotting over extended periods of time said differential changes of independent variables to visually compare said differential changes of independent variables with said limits.

8. The method as claimed in claim 7 wherein the step of computing includes the step of programming a computer to include a general influence coefficient matrix whose coefficients are a set of differential equations defining the interrelationships of the selected engine dependent and independent variables.

9. The method as claimed in claim 7 including the step of computing said engine dependent variables into values indicative of their corrected values.

10. The method of prognosticating the relative health of a gas turbine engine by analyzing the engine gas path including the steps of:
   collecting and storing a plurality of base line data on preselected engine dependent variables measured over a range of a preselected engine dependent variable, sensing said engine dependent variables over the same range of values used to measure these variables,
   computing the differences obtained from the two immediate preceding steps,
   programming a computer to compute and produce an output signal indicative of a differential change in independent variables by solving the equation obtained by stored coefficients indicative of the relationship of the selected engine independent and dependent variables with the values obtained in the step of computing, initially storing allowed limits for the selected engine independent variables and
   plotting the output signal obtained in the steps of programming and storing the limits over predetermined time intervals.

11. The method of analyzing the gas path of a gas turbine engine for diagnosing the relative health thereof, comprising the steps of
   establishing a datum for each of a plurality of engine dependent variables as a function of a predetermined engine dependent variable,
   sensing said engine dependent variables,
   generating a signal indicative of the difference between said datum and said sensed engine dependent variables,
   computing said signal obtained in the step of generating a signal into an output signal indicative of differential changes of engine independent variables, and relating said output signal into particular engine faults.

* * * * *